United States Patent Office 3,080,225
Patented Mar. 5, 1963

3,080,225
WEED CONTROL
Harold F. Wilson, Moorestown, N.J., and Dougal Harold McRae, Hatboro, Pa., assignors to Rohm & Haas Company, Philadelphia, Pa., a corporation of Delaware
No Drawing. Filed Apr. 13, 1960, Ser. No. 21,859
10 Claims. (Cl. 71—2.3)

This invention concerns a process for controlling growth of weeds and other plants. In an important aspect of this invention, weeds are controlled while in a germinating state by applying to soil a 4-nitrophenyl halophenyl ether in which the halophenyl group is selected from 2,4-dichlorophenyl, 2,4-dibromophenyl, and 3-chlorophenyl groups. These 4-nitrophenyl halophenyl ethers are not, however, all of the same activity or of exactly equal value. The first two listed are of surprising effectiveness in controlling a very wide spectrum of weed species at low rates of application at which they have not exhibited deleterious action on selected agronomic or economic plants. The other compound is quite effective in controlling growth of various weeds at desirably low rates of application, but may vary in its effectiveness for controlling specific plants. This selective action can be used to advantage, on the other hand, for example, in controlling common broad-leafed weeds among selected economic crops.

It has long been desired to discover chemical agents which will prevent, control, or destroy undesired plants in areas in which desirable plants are to be grown or are growing. In effective differential control of growth of plants it is essential that no permanent or relatively long term poisoning of soil occur. Yet a worthwhile result would be achieved if after the initial destruction of germinating weeds there remained enough residual action of the applied agent to give a fairly extended freedom from growth of weeds until expansion of the economic plants dominates the area.

It is clearly of importance also that the weed control agent be effective at low rates of application. This property is tied in with some persistence of toxic agent in soil coupled with its disappearance in due time from action of sun, air, water, and soil. Low concentrations of agent as well as type of agent may serve to limit undesirable changes in the environment in which desired plants grow, such as an upset in the natural equilibrium of soil organisms.

Some time ago it was proposed to destroy broad-leafed weeds among crops with various nitrophenols. Such compounds must be modified for controlling emerging seedlings in the soil. More recently, it has been proposed to treat soil with 4-chloro-2-nitrophenyl 4-chlorophenyl ether to control especially grasses as their seeds germinate. From our careful study of phenyl ethers over a period of time, it has been discovered that the above nitrophenyl ethers are two to ten or more times as effective as this compound, exhibiting action against many broad-leafed varieties of weeds as well as grasses, acting at minimum rates of application, and retaining activity for a suitable time followed by disappearance or inactivation of these potent ethers.

This invention provides a method for inhibiting growth of weeds, particularly in areas in which economic plants are to be grown or are growing by applying thereto one or more of the above specified ethers. In one aspect, these ethers are particularly valuable when applied to soil before emergence of weeds and grasses, a herbicidal amount of one or more of the above ethers being applied to the growth medium or locus to be protected before emergence of plants. But the method may also be applied to young, tender weeds and grasses among economic plants, due regard always being taken of the selective action or phytotoxicities of the several ethers. The method can, therefore, be considered as one of selective suppression of germinant and emerging seedlings.

This invention also concerns the selective herbicidal compositions comprising a defined ether and a carrier therefor.

The above 4-nitrophenyl halophenyl ethers have been reported in chemical literature without any recognition of their potential uses. In general, any of these ethers can be prepared by reacting by heating a phenol having a defined halogen content in the prescribed positions with p-chloronitrobenzene in the presence of an alkaline agent for taking up HCl split out. The desired product may be isolated as a residue and purified by conventional steps. The defined ethers may, if desired, be distilled under reduced pressure.

The method of preparation may be illustrated with the formation of 2,4-dichlorophenyl 4-nitrophenyl ether. A mixture of 86.5 parts by weight (0.53 mole) of 2,4-dichlorophenol, 27 parts (0.41 mole) of aqueous 85% potassium hydroxide solution, 50 parts (0.32 mole) of p-chloronitrobenzene, and 0.5 part of copper powder is heated for eight hours at 200° C. The reaction mixture is poured into ice water and the resulting mixture is extracted with ethylene dichloride. Layers form and are separated. The solvent layer is treated with charcoal, filtered, and washed with potassium hydroxide solution to remove free 2,4-dichlorophenol. Solvent is distilled off and the product is fractionally distilled. After a forerun of chiefly chloronitrobenzene, a main fraction is taken at 176°–180° C./0.9 mm., 2,4-dichlorophenyl 4-nitrophenyl ether, in a yield of 60%. The distilled product can be recrystallized from a benzene-hexane mixture and then melts at 62°–65° C. The analysis of this product shows the presence of 24.8% of chlorine and 5.18% of nitrogen (theory 25.0% and 4.94% respectively for $C_{12}H_7Cl_2CO_3$).

In the same way, m-chlorophenol is reacted with p-chloronitrobenzene to give 3-chlorophenyl 4-nitrophenyl ether, distilling at 180°–190° C./1.4 mm., melting at 58°–60° C. and containing by analysis 14.3% of chlorine and 5.59% of nitrogen (theory 14.2% and 5.63% respectively).

By reaction of 2,4-dibromophenol and p-chloronitrobenzene in the same way there is obtained 2,4-dibromophenyl 4-nitrophenyl ether, distilling at 165°–173° C./0.35 mm., melting at 75°–77° C., and containing by analysis 43.2% of bromine and 3.74% of nitrogen (theory 43.0% and 3.76% respectively).

There have also been made and examined other halophenyl nitrophenyl ethers, although these have proved much less herbicidally active. For example, 3,5-dichlorophenol and p-chloronitrobenzene were heated together in the presence of sodium hydroxide and copper powder for six hours at 175° C. The resulting 3,5-dichlorophenyl 4-nitrophenyl ether distills at 167°–171° C./0.25 mm., melts at 87°–89° C., and contains by analysis 25.3% of chlorine and 4.94% of nitrogen (theory 25.0% and 4.94% respectively). Similarly, 2,3-dichlorophenol was reacted to give 2,3-dichlorophenyl 4-nitrophenyl ether, distilling at 173°–178° C./0.4 mm. and melting at 123°–125° C. after recrystallization from benzene. Analytical data agreed closely with theory. Likewise, 2,4,5-trichlorophenyl 4-nitrophenyl ether was prepared starting with 2,4,5-trichlorophenol. This ether distills at 170°–176° C./0.25 mm. and melts at 72°–74° C. It contains 30% of chlorine and 4.3% of nitrogen. By the above procedure there is prepared 2,5-dichlorophenyl 4-nitrophenyl ether, distilling at 160°–167° C./0.2 mm. and melting at 90°–92° C. It contains 21.9% of chlorine and 4.9% of nitrogen. All of these compounds, even though new, exhibit poor herbicidal activity and are cited to show the rather unique action of the above-noted compounds.

One or a mixture of the defined ethers is applied to soil or other growth medium by applying the ether in a dispersion or a mixture with a solid carrier. For providing a dispersion, a solution of an ether may be prepared in an organic solvent. If a water-miscible solvent is used, such as acetone, methyl ethyl ketone, or dioxane, the solution may be directly extended with water and the resulting mixture applied. If there is used a water-immiscible solvent, such as benezne, toluene, xylene, or aromatic naphtha, there is also incorporated a solvent-soluble emulsifier. Useful for this purpose are ethylene oxide derivatives of alkylphenol, or long-chained alcohols, mercaptans, carboxylic acids, or reactive amines, and partially esterified polyhydric alcohols. Various sulfates and sulfonates, known as surface-active agents, may be used alone or in admixture with an ethylene oxide reaction product.

An ether may, on the other hand, be extended with a finely divided inert solid, such as chalk, magnesium carbonate, diatomaceous earth, calcium silicate, vermiculite, pyrophyllite, or a clay. The ether may be mechanically mixed therewith or applied thereon from a solution in a solvent. The mixture may be used as a dust. If desired, wetting and/or dispersing agent or agents may be added. Useful agents include surface active agents mentioned above. Typical dispersing agents include lignin sulfonates and condensed naphthaleneformaldehyde sulfonates. A proportion of about 0.5% to about 3% of dispersing agent may be used to improve dusts or to help form wettable powders. For the latter about 0.1% to 5% of a wetting agent may be used as well.

Typical compositions may be prepared by dissolving one part of one or more of the ethers in 200 parts of acetone. This solution may be extended with 200 parts of water for application. Another type of water-extendable solution may be prepared by dissolving 25 parts of one or more of the ethers in 70 parts of xylene along with 5 parts of octylphenoxypolyethoxyethanol having an average of about 20 ether groups or of a mixture of 2.5 parts of an ethylene oxide reaction product or diamylphenol and 2.5 parts of calcium dodecylbenzenesulfonate.

A dust may be prepared by grinding an ether with a finely particled solid. For example, 10 parts of an ether are ground with 40 parts of calcium silicate and this mixture then is blended with 50 parts of clay to provide a dust. Addition of three parts of sodium naphthalene formaldehyde sulfonate provides good dispersion while addition of one part of a nonylphenoxypolyethoxyethanol on three parts of magnesium carbonate provides a wettable powder.

Alternatively, a concentrated solution of an ether in acetone may be blended with one or more solid carriers and the acetone allowed to evaporate. In this way, dusts with 1% to 40% of active ether can be prepared.

The active ether is usually applied by spray or dust at a rate of about 0.5 to 10 pounds per acre, preferably at about one to four pounds per acre. At a rate of one pound per acre, 2,4-dichlorophenyl 4-nitrophenyl ether applied to cultivated soil by spraying thereon an aqueous dispersion stops germination of 90% of curly dock and 100% of pigweeds, crabgrass, lamb's quarter, foxtail, millet, and sorrel. At three pounds or more per acre, this compound, applied in the same way, controls the germination of 100% of each of these weed seeds, also barn yard grasses, annual rye grasses, Sudan grass, orchard grass, carpet weed, purslane, scarlet pimpernel, and plantanes.

On the other hand, this compound does not inhibit germination of wheat seed at one pound per acre, while at three pounds per acre this compound inhibits the growth of only 10% of wheat seed.

By way of contrast, 4-chlorophenyl 4-chloro-2-nitrophenyl ether, applied under the conditions recommended for its use, failed when applied at one and two pounds per acre to inhibit the growth of crabgrass, millet, orchard grass, Sudan grass, foxtail, ryegrass, sorghum, barnyard grass, curly dock, pigweeds, sorrel, lamb's quarters, and Indian mallow. When this compound was applied at the rate of four pounds per acre, 20% inhibition of growth of crabgrass, millet, red pigweed, and sorrel was observed, 50% inhibition of lamb's quarter, and 0% inhibition of all of the rest of the varieties of test plants.

In addition to control of weeds in wheat by application prior to emergence, the 2,4-dihalophenyl 4-nitrophenyl ether can be used to control weeds in such economic crops as peas, snap beans, lima beans, soybeans, cotton, carrots, sugar beets, table beets, and potatoes, in connection with which application rates of 2 to 8 pounds per acre have been shown as practical and effective. At application rates of 2 to 6 pounds per acre, according to present data, weeds may be controlled effectively in muskmelon, squash, broccoli, clover, rice, sweet corn, field corn, peanuts, wheat, and rye. Weeds may also be controlled in ground to be used for tomato transplants by applying a 2,4-dihalophenyl 4-nitrophenyl ether at 2 to 8 pounds per acre prior ot setting out of the plants.

Tests with 2,4-dibromophenyl 4-nitrophenyl ether show control of weed plants very much like the comparable 2,4-dichloro-compound. This ether can likewise be applied to soil, either by spraying an aqueous dispersion or by applying a dust. Because of somewhat higher molecular weight for this dibromo-compound compared to the dichloro-compound, slightly larger rates of application may be used, but the control of growth follows the identical pattern, controlling such weeds as crabgrass, foxtail, millet, lamb's quarter, sorrel, and pigweed, while having little influence on wheat and other economic crops such as mentioned above. At 5 pounds per acre the dibromo analogue has a pre-emergence inhibition of only 10% of wheat.

The compound 3-chlorophenyl 4-nitrophenyl ether, when applied in the same way at a rate of 5 lbs. per acre gives 90% control of mustard and 100% control of such weeds as wild oats, wild carrots, curly dock, pigweed, and chickweed. Yet it is safely used even at this rate on the economic plants listed above. Tests have shown this compound also is effective for weed control in areas devoted to economic crops.

It is of considerable interest and importance that the specified ethers also exhibit useful post-emergence activity. There were planted separate plots of crab grass, lamb's quarter, millet, and red root pigweed. Two weeks after plants had developed, they were sprayed with aqueous dispersions of compounds under test at the rate of 3 pounds per acre. After another two weeks, observations were made as to the kill of plants. With 2,4-dichlorophenyl 4-nitrophenyl ether kills of 100% of these weeds were obtained.

In contrast—under the same conditions, 4-chloro-2-nitrophenyl 4-chlorophenyl ether gave no kill of lamb's quarter and pigweed, 10% kill of millet, and 20% kill of crabgrass.

This invention provides, therefore, a useful method for inhibiting growth of weeds and grasses among agronomic or economic plants.

We claim:
1. A process for inhibiting growth of weeds which comprises applying to the locus to be protected from weeds in an amount sufficient to exert herbicidal action thereon and at a rate from about 0.5 to about 10 pounds per acre at least one compound from the class consisting of 2,4-dichlorophenyl 4-nitrophenyl ether, 2,4-dibromophenyl 4-nitrophenyl ether, and 3-chlorophenyl 4-nitrophenyl ether.

2. A method of controlling growth of weeds and grasses among agronomic plants which comprises applying the surface of soil before emergence of weeds and grasses therefrom an ether from the class consisting of 2,4-dichlorophenyl 4-nitrophenyl ether, 2,4-dibromophenyl 4-nitrophenyl ether, and 3-chlorophenyl 4-nitrophenyl ether in an amount sufficient to inhibit growth of weeds and grasses and at a rate from about 0.5 to about 10 pounds per acre.

3. A method for control of weeds which comprises bringing into contact with weed seedlings a compound from the class consisting of 2,4-dichlorophenyl 4-nitrophenyl ether, 2,4-dibromophenyl 4-nitrophenyl ether, and 3-chlorophenyl 4-nitrophenyl ether in an amount sufficient to suppress growth of said weed seedlings and at a rate from about 0.5 to about 10 pounds per acre.

4. A method for selectively suppressing growth of seedlings of one variety of plants among a second variety of plants in the same area of a growth medium which comprises applying to the surface of the growth medium prior to emergence of the seedlings of the first variety in the area a compound from the class consisting of 2,4-dichlorophenyl 4-nitrophenyl ether, 2,4-dibromophenyl 4-nitrophenyl ether, and 3-chlorophenyl 4-nitrophenyl ether at a rate between 0.5 and 10 pounds per acre which suppresses growth of said first variety, without suppressing growth of the said second variety, said second variety being tolerant to said compound at the rate of application.

5. A method for selectively suppressing growth of seedlings of one variety of plants among seedlings of a second variety of plants developing in the same growth medium which comprises applying to the surface of the growth medium prior to emergence of seedlings of the first variety of plants 2,4-dichlorophenyl 4-nitrophenyl ether at a rate between 0.5 and 10 pounds per acre which suppresses growth of seedlings of said first variety without suppressing growth of the said second variety of plants, said second variety being tolerant to 2,4-dichlorophenyl 4-nitrophenyl ether at its rate of application.

6. A method for selectively suppressing growth of seedlings of one variety of plants among seedlings of a second variety of plants developing in the same growth medium, which comprises applying to the surface of the growth medium prior to emergence of the first variety of plants 3-chlorophenyl 4-nitrophenyl ether at a rate between 0.5 and 10 pounds per acre which suppresses growth of seedlings of said first variety without suppressing growth of the said second variety of plants, said second variety being tolerant to 3-chlorophenyl 4-nitrophenyl ether at its rate of application.

7. A method for controlling growth of undesired plants in a growth medium which comprises applying to the surface of said medium prior to emergence of seedlings of said plants from said medium 2,4-dichlorophenyl 4-nitrophenyl ether in an amount sufficient to control growth of said plants and at a rate from about 0.5 to about 10 pounds per acre.

8. A method for controlling growth of undesired plants in a growth medium which comprises applying to the surface of said medium prior to emergence of seedlings of said plants from said medium 3-chlorophenyl 4-nitrophenyl ether.

9. A process for inhibiting growth of weeds which comprises applying 2,4-dichlorophenyl 4-nitrophenyl ether to the locus to be protected from weeds in an amount sufficient to exert herbicidal action thereon and at a rate from about 0.5 to about 10 pounds per acre.

10. A method of controlling growth of weeds and grasses among agronomic plants which comprises applying 2,4-dichlorophenyl 4-nitrophenyl ether to the surface of soil before emergence of weeds and grasses therefrom in an amount sufficient to inhibit growth of weeds and grasses and at a rate from about 0.5 to about 10 pounds per acre.

References Cited in the file of this patent

UNITED STATES PATENTS

| | | |
|---|---|---|
| 2,287,249 | Holt | June 23, 1942 |
| 2,708,624 | Denny | May 17, 1955 |
| 2,726,946 | Mussel | Dec. 13, 1955 |

OTHER REFERENCES

Raiford et al.: "J. Am. Chem. Soc.," vol. 52, 1930, pages 1205–1209.

Ikawa in "Chemical Abstracts," vol. 53, Sept.-Oct. 1959, col. 16042i.